United States Patent
Liu et al.

(10) Patent No.: US 10,722,864 B2
(45) Date of Patent: Jul. 28, 2020

(54) MANGANESE DIOXIDE NANOWIRE @ MULTIDIMENSIONAL MESOPOROUS METAL-ORGANIC FRAMEWORK ADSORBENT AND PREPARATION THEREFOR

(71) Applicant: Research Center for Eco-Environmental Sciences, Chinese Academy of Sciences, Beijing (CN)

(72) Inventors: Ruiping Liu, Beijing (CN); Meipeng Jian, Beijing (CN); Huan Wang, Beijing (CN); Bao Liu, Beijing (CN); Huijuan Liu, Beijing (CN); Jiuhui Qu, Beijing (CN)

(73) Assignee: Research Center for Eco-Environmental Sciences, Chinese Academy of Sciences, Beijing (CN)

( * ) Notice: Subject to any disclaimer, the term of this patent is extended or adjusted under 35 U.S.C. 154(b) by 219 days.

(21) Appl. No.: 15/806,235

(22) Filed: Nov. 7, 2017

(65) Prior Publication Data
US 2018/0056269 A1 Mar. 1, 2018

Related U.S. Application Data

(63) Continuation of application No. PCT/CN2015/097819, filed on Dec. 18, 2015.

(30) Foreign Application Priority Data

Dec. 7, 2015 (CN) .......................... 2015 1 0890730

(51) Int. Cl.
| | |
|---|---|
| B01J 20/22 | (2006.01) |
| B01J 20/32 | (2006.01) |
| B01J 20/28 | (2006.01) |
| C02F 1/28 | (2006.01) |
| B01J 20/06 | (2006.01) |
| B01J 20/30 | (2006.01) |
| C01G 45/02 | (2006.01) |
| C02F 1/66 | (2006.01) |
| C02F 101/10 | (2006.01) |
| C02F 101/20 | (2006.01) |

(52) U.S. Cl.
CPC ............ *B01J 20/226* (2013.01); *B01J 20/06* (2013.01); *B01J 20/28007* (2013.01); *B01J 20/3085* (2013.01); *B01J 20/3204* (2013.01); *B01J 20/3265* (2013.01); *B01J 20/3272* (2013.01); *B01J 20/3293* (2013.01); *C01G 45/02* (2013.01); *C02F 1/28* (2013.01); *C02F 1/285* (2013.01); *C02F 1/66* (2013.01); *C01P 2004/16* (2013.01); *C02F 2101/103* (2013.01); *C02F 2101/20* (2013.01)

(58) Field of Classification Search
CPC ................ B01J 20/3085; B01J 20/3204; B01J 20/3293; B01J 20/3272; C02F 1/66; C02F 1/28; C02F 2101/103; C01P 2004/16
See application file for complete search history.

(56) References Cited

U.S. PATENT DOCUMENTS

| | | | |
|---|---|---|---|
| 2010/0181258 A1* | 7/2010 | Qu ....................... | B01J 20/3236 210/683 |
| 2013/0000952 A1* | 1/2013 | Srinivas ................... | H01B 1/02 174/126.1 |

FOREIGN PATENT DOCUMENTS

| | | | |
|---|---|---|---|
| CN | 103936116 A | * | 7/2014 |
| CN | 104096542 A | * | 10/2014 |

* cited by examiner

Primary Examiner — Vishal V Vasisth
(74) Attorney, Agent, or Firm — Tony Hom, Esq.

(57) ABSTRACT

A manganese dioxide nanowire @ multidimensional mesoporous metal-organic framework adsorbent and application method thereof for removing heavy metals from water. A multidimensional mesoporous metal-organic framework material is prepared from metal ions and organic ligands by means of a self-assembly reaction; a manganese dioxide nanowire is prepared from manganese salt and thiosulfate by means of reaction in a reaction kettle. The adsorbent possesses not only the characteristics of a multidimensional mesoporous metal-organic framework material, such as reticulated pore adaptation, a large specific surface area, and abundant reaction sites, but also the oxidative and catalytic properties of manganese dioxide nanowire.

16 Claims, No Drawings

MANGANESE DIOXIDE NANOWIRE @ MULTIDIMENSIONAL MESOPOROUS METAL-ORGANIC FRAMEWORK ADSORBENT AND PREPARATION THEREFOR

This application is a CON of PCT/CN2015/097819, filed Dec. 18, 2015.

TECHNICAL FIELD

The present disclosure belongs to the technical field of new materials for water treatment, and particularly relates to a manganese dioxide nanowire @ multi-dimensional mesoporous metal organic framework adsorbent and the application therefor in removal of arsenic, antimony and other heavy metals in water.

BACKGROUND ART

Due to the advantages of being low in cost, convenient to operate and manage and the like, adsorption method is a common technology for removing heavy metals in water. Various heavy metal adsorbents are reported at home and abroad, and commercial products are also available in the market. But the large-scale successful application is limited due to factors such as low adsorption capacity, frequent regeneration period and the like. The development of high-performance adsorption material has important significance for expanding the application of adsorption technology in engineering.

Metal organic framework materials are novel porous materials found in the academic world in recent years, and have a specific surface area of 5000 $m^2/g$ or more, and are an ideal adsorption material. The metal organic framework materials reported at home and abroad are mainly used for gas separation, storage or catalysis, and there are few reports about those metal organic frameworks aiming at water treatment system. In this way, the inventor of the present invention invented a multi-dimensional mesoporous metal organic framework adsorbent and the application method thereof in the removal of heavy metals in water such as stibium and arsenic (application number: 201410419401.0). The adsorbent has a good application prospect. However, there exist multiple forms of arsenic-antimony pollutants with different valence states in water, such as trivalent arsenic, pentavalent arsenic, trivalent antimony, pentavalent antimony and the like. Trivalent arsenic is difficult to remove in water, and the adsorption quantity of it can be greatly improved after it is oxidized into pentavalent arsenic. If chlorine, ozone, potassium permanganate and other chemical oxidants are adopted, there are problems that the reaction between the residual oxidizing agent and the multi-dimensional mesoporous metal organic framework adsorbent will make the structure collapse and the functional group inactivated, and the addition of the oxidizing agent also makes the treatment process more complex.

Aiming at the above problems, the disclosure provides a novel oxidation adsorption material obtained by loading a multi-dimensional mesoporous organic framework adsorbent on the surface of the manganese dioxide nanowire. The conversion of the arsenic-antimony valence state is completed through the oxidation property of the material; the loading type adsorption material is more stable and has adaptability within a wider pH range.

SUMMARY OF THE DISCLOSURE

One object of the present disclosure is to provide a manganese dioxide nanowire @ multi-dimensional mesoporous metal organic framework adsorbent, which has high performance and is easy to apply, for the heavy metal pollutants such as arsenic and antimony in water.

Another object of the present disclosure is to provide an application of the manganese dioxide nanowire @ multi-dimensional mesoporous metal organic framework adsorbent in arsenic-polluted, antimony-polluted water treatment process.

The technical principle of the present disclosure is that: the manganese dioxide has oxidation performance, and the manganese dioxide nanowire has the advantages such as the rich specific surface area, the high reaction activity, and the controllable structure; the donation and self-assembly reaction can be generated between the polydentate organic ligand containing oxygen and nitrogen such as 2-methylimidazole, and transition metal ions such as $Zn^{2+}$ to form a multi-dimensional mesoporous metal organic framework adsorbent with large specific surface area, moderate pore structure and abundant active sites. The multi-dimensional mesoporous metal organic framework material is loaded on the surface of the manganese dioxide nanowire, and both of the oxidation and adsorption performances can be realized at the same time. The material has good adsorption performance for heavy metals such as arsenic and antimony, and can be used for efficiently adsorbing and removing heavy metals in water after being added into water. The suspension in the water may be removed through a solid-liquid separation unit, and then arsenic and antimony in the water are removed.

In order to achieve the above objects, the present disclosure adopts the following technical solutions:

a manganese dioxide nanowire @ multi-dimensional mesoporous metal organic framework adsorbent, which is obtained by loading multi-dimensional mesoporous metal organic frameworks on the surface of manganese dioxide nanowires. More specifically, the adsorbent is prepared by the following method:

(1) preparing the manganese dioxide nanowires by adopting the following method:

a. respectively preparing a manganese salt solution and a thiosulfate solution; preferably, wherein the molar ratio of the manganese salt to the thiosulfate is 1:4~4:1; preferably, an ammonium sulfate solution also can be added into the thiosulfate solution, wherein the molar ratio of ammonium sulfate to thiosulfate is 1:1~2:1;

b. under the condition of sufficient stirring, adding the manganese salt solution into the thiosulfate solution or adding the thiosulfate solution into the manganese salt solution;

c. reacting for 8~12 hours in a reaction kettle with the temperature of 105~120° C. under the condition of isolating air;

d. separating a solid from the solution by a solid-liquid separation method, washing the obtained solid with pure water for three times and drying at the temperature of 90~105° C.;

(2) respectively preparing a methanol solution of imidazole, a methanol solution of acetate and a methanol solution of zinc salt; preferably, the molar ratio of the zinc salt to the acetate is 1:4~4:1; the molar ratio of the zinc salt to the imidazole is 1:5~1:40;

(3) putting the manganese dioxide nanowires into methanol, and carrying out a ultrasonic treatment for 30~120 min; preferably, the mass ratio of the manganese dioxide nanowires to methanol is 1:100~1:500;

(4) sequentially adding the methanol solution of imidazole, the methanol solution of zinc salt and the methanol solution of acetate with the same volume as the volume of the methanol used in step (3), and reacting for 120~240 min under an ultrasonic condition;

(5) separating a solid from the solution by adopting a solid-liquid separation method, then obtaining the manganese dioxide nanowire @ multi-dimensional mesoporous metal organic framework adsorbent.

The zinc salt is selected from at least one of zinc chloride, zinc sulfate and zinc nitrate, zinc formate, zinc acetate and zinc benzoate.

The acetate is selected from at least one of sodium acetate, potassium acetate and ammonium acetate.

The imidazole is selected from 2-methylimidazole, or a mixture of 2-methylimidazole and at least one of 1-methylimidazole, 2-ethyl imidazole, and methyl ethyl imidazole, and the mass ratio of 2-methylimidazole in the mixture is over 75%.

The manganese salt is selected from at least one of manganese chloride, manganese sulfate and manganese nitrate.

The thiosulfate is selected from at least one of sodium thiosulfate, potassium thiosulfate and ammonium thiosulfate.

The manganese dioxide nanowire @ multi-dimensional mesoporous metal organic framework adsorbent can be applied to remove heavy metals in water, and especially suitable for removing the heavy metals such as arsenic and antimony in water.

The present disclosure also provides an application method of the manganese dioxide nanowire @ multi-dimensional mesoporous metal organic framework adsorbent:

adjusting the pH value of the to-be-treated water to more than 7.0; adding the manganese dioxide nanowire @ multi-dimensional mesoporous metal organic framework adsorbents, wherein the feeding amount is 0.01~1 g/L; then fully mixing, wherein the mixing reaction time is 0.5~10 min; then removing suspended substances in the water through solid-liquid separation, so that the treated water meets the domestic drinking water sanitary standard or the industrial wastewater discharge standard and can be discharged.

The solid-liquid separation method is selected from one of precipitation, medium filtration and membrane filtration, or a combination of two or more of them.

The present disclosure has the following beneficial effects:

(1) the adsorbent of the present disclosure has the oxidation and adsorption performances at the same time. Additional oxidants do not need to be added;

(2) the specific surface area of the adsorbent of the present disclosure is large and is more than two times larger than that of powdered activated carbon; the adsorption performance of the adsorbent is very high, and the adsorption capacity for heavy metals such as arsenic and antimony is far higher than that of a traditional adsorption material;

(3) the supported multi-dimensional mesoporous metal organic framework adsorbent is more stable in a more broad-spectrum range of pH;

(4) the adsorbent of the present disclosure can be applied to remove heavy metals such as arsenic and antimony in drinking water and industrial wastewater, and can also be applied to remove heavy metals in lakes, reservoirs and underground water.

DETAILED DESCRIPTION

The present disclosure is described by specific embodiments herein below. Unless otherwise indicated, the technical means used in the present disclosure are known to those skilled in the art. In addition, the embodiments are to be understood as illustrative and not intended to limit the scope of the present disclosure. The spirit scope of the present disclosure is limited only by the claims. For those skilled in the art, without departing from the spirit and scope of the present disclosure, various changes and modifications of the material components and the use amount in the embodiments belong to the protection scope of the present disclosure.

Example 1

The preparation of the manganese dioxide nanowire @ multi-dimensional mesoporous metal organic framework adsorbent is as follows:

(1) a manganese chloride solution and a sodium thiosulfate solution were prepared respectively, wherein the molar ratio of manganese chloride to sodium thiosulfate is 1:1; and a zinc chloride methanol solution, a potassium acetate methanol solution and a 2-methylimidazole methanol solution were prepared respectively, wherein the molar ratio of zinc chloride to potassium acetate is 1:2, the molar ratio of zinc chloride to 2-methylimidazole is 1:5;

(2) under the condition of sufficient stirring, the manganese chloride solution was added into the sodium thiosulfate solution;

(3) a reaction was executed for 8 hours in a reaction kettle with the temperature of 105° C. under the condition of isolating air;

(4) a solid was separated from the solution by adopting a centrifugation method, the obtained solid was cleaned with pure water for three times, and dried at the temperature of 90° C. to obtain manganese dioxide nanowires;

(5) the manganese dioxide nanowires were put into methanol, and a ultrasonic treatment was carried out for 30 min; in which the mass ratio of the manganese dioxide nanowires to methanol is 1:500;

(6) under a magnetic stirring condition (the rotation speed of magneton is 350 rpm), the 2-methylimidazole methanol solution, the zinc chloride methanol solution and the potassium acetate methanol solution were added sequentially with the same volume as that of the methanol; after standing for 5 minutes, a reaction was executed for 120 minutes under an ultrasonic condition;

(7) a solid was separated from the solution by adopting a centrifugal separation method, and the supernate was skimmed, then the manganese dioxide nanowire @ multi-dimensional mesoporous metal organic framework adsorbent can be obtained.

The above adsorbent is applied to remove arsenic in drinking water:

the to-be-treated water is an arsenic-containing underground water, the arsenic concentration is 100 μg/L. The pH value of the to-be-treated water was adjusted to 7.8; the manganese dioxide nanowire @ multi-dimensional mesoporous metal organic framework adsorbents were added into the water, wherein the addition amount is 0.05 g/L; then sufficient mixing was done under the mechanical stirring condition (the rotating speed of the stirring paddle is 200 rpm), wherein the mixing reaction time is 0.5 min; and then suspended substances in the water were removed by precipitation plus media filtration. The arsenic concentration of the filtered water meets the domestic drinking water sanitary standard (<10 μg/L).

Example 2

The preparation of the manganese dioxide nanowire @ multi-dimensional mesoporous metal organic framework adsorbent:
(1) a manganese nitrate solution and an ammonium thiosulfate solution were prepared respectively, wherein the molar ratio of manganese nitrate to ammonium thiosulfate is 1:4; a zinc nitrate methanol solution, a potassium acetate methanol solution and a methanol solution of 2-methylimidazole and 1-methylimidazole (wherein the mass ratio of 2-methylimidazole is 75%) were prepared respectively, wherein the molar ratio of zinc nitrate to potassium acetate is 2:1; the molar ratio of the zinc salt in the zinc nitrate solution to the imidazole in the methanol solution of imidazole is 1:40;
(2) the manganese nitrate solution was added into the ammonium thiosulfate solution under the condition of sufficient stirring;
(3) a reaction was executed for 12 hours in a reaction kettle with the temperature of 120° C. under the condition of isolating air;
(4) a solid was separated from the solution by adopting a membrane filtration method, and the obtained solid was cleaned with pure water for three times, and dried at 105° C. to obtain manganese dioxide nanowires;
(5) the manganese dioxide nanowires were put into a methanol solution, and a ultrasonic treatment was carried out for 120 min; wherein the mass ratio of the manganese dioxide nanowires to methanol is 1:100;
(6) under the mechanical stirring condition (the rotating speed of the stirring paddle is 160 rpm), the methanol solution of imidazole, the zinc nitrate methanol solution and the potassium acetate methanol solution were added sequentially with the same volume as that of the methanol, and after standing for 5 minutes, a reaction was executed for 240 minutes under an ultrasonic condition;
(7) a solid was separated from the solution by adopting a membrane separation method, and the supernate was skimmed, then the manganese dioxide nanowire @ multi-dimensional mesoporous metal organic framework adsorbent can be obtained.

The adsorbent is applied to remove antimony in drinking water:
the to-be-treated water is a drinking water source water polluted by antimony, the concentration of the antimony is 60 μg/L. The pH value of the to-be-treated water was adjusted to 7.0; The manganese dioxide nanowire @ multi-dimensional mesoporous metal organic framework adsorbents were added into water, wherein the addition amount is 0.2 g/L; then sufficient mixing was done under the mechanical stirring condition (the rotating speed of the stirring paddle is 150 rpm), wherein the mixing reaction time is 10 min; then suspended substances in the water were removed by membrane filtration. The antimony concentration of the filtered water meets the domestic drinking water sanitary standard (<5 μg/L).

Example 3

The preparation method of the manganese dioxide nanowire @ multi-dimensional mesoporous metal organic framework adsorbent is as follows:
(1) a manganese sulfate solution and a potassium thiosulfate solution were prepared respectively, wherein the molar ratio of manganese sulfate to potassium thiosulfate is 4:1, a ammonium sulfate solution was added into the thiosulfate solution, wherein the molar ratio of ammonium sulfate to thiosulfate is 2:1; a zinc acetate methanol solution, a sodium acetate methanol solution, and a methanol solution of 2-methylimidazole with 1-methylimidazole, 2-ethyl imidazole and methyl ethyl imidazole (wherein the proportion of 2-methylimidazole is 80%) were prepared respectively; wherein the molar ratio of zinc acetate to sodium acetate is 1:4; the molar ratio of zinc acetate to the imidazole is 1:30;
(2) under the condition of sufficient stirring, the manganese sulfate solution was added into the mixed solution of the potassium thiosulfate and the ammonium sulfate solution;
(3) a reaction was executed for 10 hours in a reaction kettle with the temperature of 110° C. under the condition of isolating air;
(4) a solid was separated from the solution by adopting a membrane filtration method, the obtained solid was cleaned for three times by pure water, and dried at 100° C. to obtain manganese dioxide nanowires;
(5) the manganese dioxide nanowires were put into methanol, and a ultrasonic treatment was carried out for 120 min; the mass ratio of the manganese dioxide nanowires to the methanol is 1:200;
(6) under a magnetic stirring condition (the rotation speed of magneton is 320 rpm), the methanol solution of imidazole, the zinc acetate methanol solution and the sodium acetate methanol solution were added sequentially with the same volume as the methanol, and after standing for 5 minutes, a reaction was executed for 180 min under an ultrasonic condition;
(7) a solid was separated from the solution by adopting a membrane separation method, and the supernate was skimmed, then the manganese dioxide nanowire @ multi-dimensional mesoporous metal organic framework adsorbent can be obtained.

The adsorbent is applied to remove arsenic in industrial wastewater:
the to-be-treated water is wastewater discharged by a certain gallium arsenide production enterprise, the concentration of the arsenic is 8 mg/L. The pH value of the to-be-treated water was adjusted to 8.0; the manganese dioxide nanowire @ multi-dimensional mesoporous metal organic framework adsorbents were added into water, and the addition amount is 1 g/L; then sufficient mixing was done under the mechanical stirring condition (the rotating speed of the stirring paddle is 180 rpm), wherein the mixing reaction time is 5 min; and part of suspended matters were removed firstly by precipitation treatment, then remain suspended substances in the water were removed sequentially by medium filtration or membrane filtration. The arsenic concentration of the filtered water meets the industrial wastewater discharge standard (<0.5 mg/L).

What is claimed is:
1. A manganese dioxide nanowire @ multi-dimensional mesoporous metal organic framework adsorbent, wherein the adsorbent is prepared by loading multi-dimensional mesoporous metal organic frameworks on the surface of manganese dioxide nanowires, the preparation method comprises the following steps:
(1) respectively preparing a manganese salt solution and a thiosulfate solution to prepare a manganese dioxide nanowire;
(2) respectively preparing a methanol solution of imidazole, a methanol solution of acetate and a methanol solution of zinc salt; wherein, the molar ratio of the zinc salt to the acetate is 1:4~4:1; the molar ratio of the zinc salt to the imidazole is 1:5~1:40;
(3) putting the manganese dioxide nanowires into methanol, and carrying out ultrasonic treatment for 30~120 min, in which the mass ratio of the manganese dioxide nanowires to the methanol is 1:100~1:500;

(4) sequentially adding the methanol solution of imidazole, the methanol solution of zinc salt and the methanol solution of acetate with the same volume as the volume of methanol used in step (3), then reacting for 120~240 min under an ultrasonic condition;

(5) separating a solid from the solution by adopting a solid-liquid separation method, then obtaining the manganese dioxide nanowire @ multi-dimensional mesoporous metal organic framework adsorbent.

2. The manganese dioxide nanowire @ multi-dimensional mesoporous metal organic framework adsorbent according to claim 1, wherein the preparation method of the manganese dioxide nanowire is as follows:

a. respectively preparing a manganese salt solution and a thiosulfate solution, wherein the molar ratio of the manganese salt to the thiosulfate is 1:4~4:1;

b. under the condition of stirring, adding the manganese salt solution into the thiosulfate solution or adding the thiosulfate solution into the manganese salt solution;

c. reacting for 8~12 h in a reaction kettle with the temperature of 105~120° C. under the condition of air isolation;

d. separating a solid from the solution by adopting a solid-liquid separation method, cleaning the obtained solid by pure water for three times and drying at the temperature of 90~105° C.

3. The manganese dioxide nanowire @ multi-dimensional mesoporous metal organic framework adsorbent according to claim 2, wherein in the process of adding the ammonium sulfate solution into the thiosulfate solution, the molar ratio of ammonium sulfate to thiosulfate is 1:1~2:1.

4. The manganese dioxide nanowire @ multi-dimensional mesoporous metal organic framework adsorbent according to claim 1, wherein the manganese salt is selected from at least one of manganese chloride, manganese sulfate and manganese nitrate.

5. The manganese dioxide nanowire @ multi-dimensional mesoporous metal organic framework adsorbent according to claim 1, wherein, the zinc salt is selected from at least one of zinc chloride, zinc sulfate, zinc nitrate, zinc formate, zinc acetate and zinc benzoate.

6. The manganese dioxide nanowire @ multi-dimensional mesoporous metal organic framework adsorbent according to claim 1, wherein the acetate is selected from at least one of sodium acetate, potassium acetate and ammonium acetate.

7. The manganese dioxide nanowire @ multi-dimensional mesoporous metal organic framework adsorbent according to claim 1, wherein the imidazole is selected from 2-methylimidazole, or a mixture of 2-methylimidazole with at least one of 1-methylimidazole, 2-ethyl imidazole, and methyl ethyl imidazole, and the mass ratio of 2-methylimidazole in the mixture is over 75%.

8. The manganese dioxide nanowire @ multi-dimensional mesoporous metal organic framework adsorbent according to claim 1, wherein the thiosulfate is selected from at least one of sodium thiosulfate, potassium thiosulfate and ammonium thiosulfate.

9. The application of the manganese dioxide nanowire @ multi-dimensional mesoporous metal organic framework adsorbent according to claim 1, wherein, the adsorbent is used for removing heavy metals in water, the application method of the adsorbent is as follows: adjusting the pH value of the to-be-treated water to more than 7.0; adding the manganese dioxide nanowire @ multi-dimensional mesoporous metal organic framework adsorbents, the addition amount is 0.01~1 g/L; and then fully mixing, the mixing reaction time is 0.5~10 min; then removing suspended substances in the water through solid-liquid separation, so that the treated water meets the domestic drinking water sanitary standard or the industrial wastewater discharge standard and can be discharged.

10. The application of the manganese dioxide nanowire @ multi-dimensional mesoporous metal organic framework adsorbent according to claim 9, wherein, the preparation method of the manganese dioxide nanowire is as follows:

a. respectively preparing a manganese salt solution and a thiosulfate solution, wherein the molar ratio of the manganese salt to the thiosulfate is 1:4~4:1;

b. under the condition of stirring, adding the manganese salt solution into the thiosulfate solution or adding the thiosulfate solution into the manganese salt solution;

c. reacting for 8~12 h in a reaction kettle with the temperature of 105~120° C. under the condition of air isolation;

d. separating a solid from the solution by adopting a solid-liquid separation method, cleaning the obtained solid by pure water for three times and drying at the temperature of 90~105° C.

11. The application of the manganese dioxide nanowire @ multi-dimensional mesoporous metal organic framework adsorbent according to claim 9, wherein, in the process of adding the ammonium sulfate solution into the thiosulfate solution, the molar ratio of ammonium sulfate to thiosulfate is 1:1~2:1.

12. The application of the manganese dioxide nanowire @ multi-dimensional mesoporous metal organic framework adsorbent according to claim 9, wherein, the manganese salt is selected from at least one of manganese chloride, manganese sulfate and manganese nitrate.

13. The application of the manganese dioxide nanowire @ multi-dimensional mesoporous metal organic framework adsorbent according to claim 9, wherein, the zinc salt is selected from at least one of zinc chloride, zinc sulfate, zinc nitrate, zinc formate, zinc acetate and zinc benzoate.

14. The application of the manganese dioxide nanowire @ multi-dimensional mesoporous metal organic framework adsorbent according to claim 9, wherein, the acetate is selected from at least one of sodium acetate, potassium acetate and ammonium acetate.

15. The application of the manganese dioxide nanowire @ multi-dimensional mesoporous metal organic framework adsorbent according to claim 9, wherein, the imidazole is selected from 2-methylimidazole, or a mixture of 2-methylimidazole with at least one of 1-methylimidazole, 2-ethyl imidazole, and methyl ethyl imidazole, and the mass ratio of 2-methylimidazole in the mixture is over 75%.

16. The application of the manganese dioxide nanowire @ multi-dimensional mesoporous metal organic framework adsorbent according to claim 9, wherein, the thiosulfate is selected from at least one of sodium thiosulfate, potassium thiosulfate and ammonium thiosulfate.

* * * * *